(12) United States Patent
Hoffmann et al.

(10) Patent No.: US 6,197,449 B1
(45) Date of Patent: Mar. 6, 2001

(54) ELECTRODE ARRANGEMENT AND AN ELECTROCHEMICAL BATTERY PRODUCED THEREFROM AND A METHOD FOR THE MANUFACTURE THEREOF

(76) Inventors: Hans Hoffmann, Endersbacher Strasse 51, D-70374 Stuttgart (DE); Sven Siemonsen, Darmstätter Strasse 84, D-70376 Stuttgart (DE)

(*) Notice: Subject to any disclaimer, the term of this patent is extended or adjusted under 35 U.S.C. 154(b) by 0 days.

(21) Appl. No.: 08/894,559
(22) PCT Filed: Jul. 26, 1995
(86) PCT No.: PCT/EP95/02986
  § 371 Date: Oct. 31, 1997
  § 102(e) Date: Oct. 31, 1997
(87) PCT Pub. No.: WO96/26552
  PCT Pub. Date: Aug. 29, 1996

(30) Foreign Application Priority Data

Feb. 24, 1995 (DE) ............................................. 195 06 496

(51) Int. Cl.[7] ................................................. H01M 4/70
(52) U.S. Cl. ........................................... 429/233; 29/623.1
(58) Field of Search .................................. 429/233, 243, 429/244, 241, 242, 209; 29/2, 623.1

(56) References Cited

U.S. PATENT DOCUMENTS

| | | | |
|---|---|---|---|
| 4,486,517 | * 12/1984 | Bender | 429/233 |
| 5,242,768 | * 9/1993 | Nagatsuka et al. | 429/127 |
| 5,434,024 | * 7/1995 | Ikeda et al. | 429/233 |
| 5,999,399 | * 12/1999 | Hoffmann et al. | |

FOREIGN PATENT DOCUMENTS

| | | |
|---|---|---|
| 146063 | 11/1903 | (DE) . |
| 669791 | 10/1939 | (DE) . |
| 3005725C2 | 12/1983 | (DE) . |
| 3922425A1 | 1/1991 | (DE) . |

OTHER PUBLICATIONS

Patent Abstracts of Japan, vol. 8, No. 78 (E–237), 58–225569 (Hitachi Seisakusho K.K.), Dec. 27, 1983.

* cited by examiner

*Primary Examiner*—Maria Nuzzolillo
*Assistant Examiner*—Susy Tsang
(74) *Attorney, Agent, or Firm*—Jones, Tullar & Cooper, P.C.

(57) ABSTRACT

An electrode arrangement for the cells of batteries includes two electrodes each having a three-dimensional grid-type structure, which are held spaced apart from one another. The electrodes are arranged interleaved with one another in all directions in space.

25 Claims, 12 Drawing Sheets

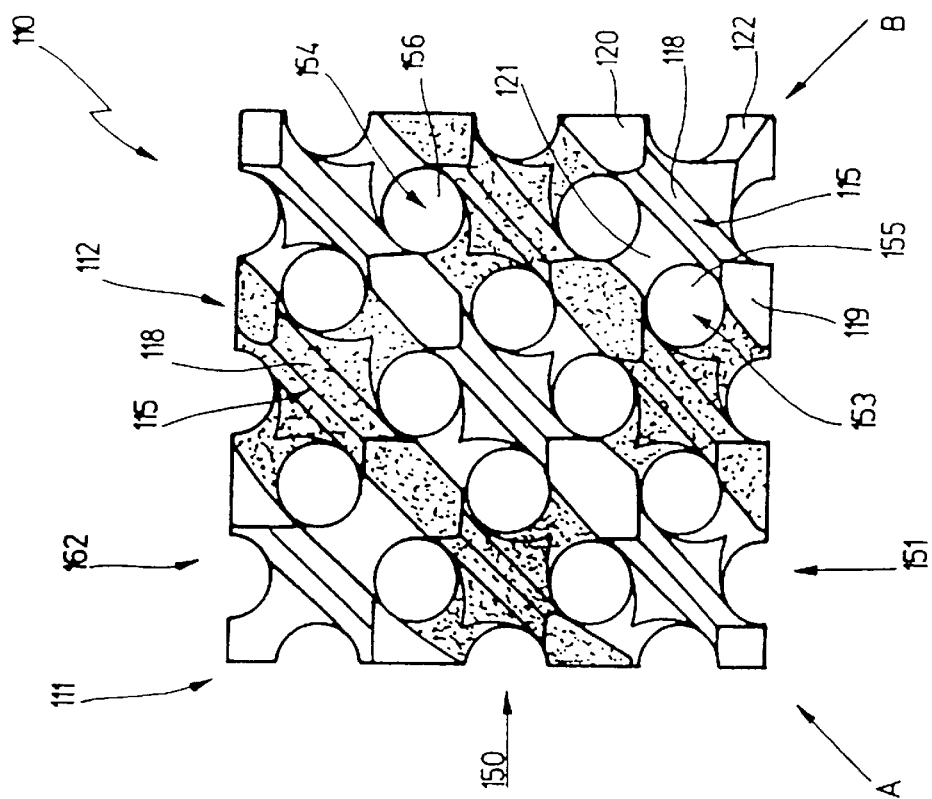

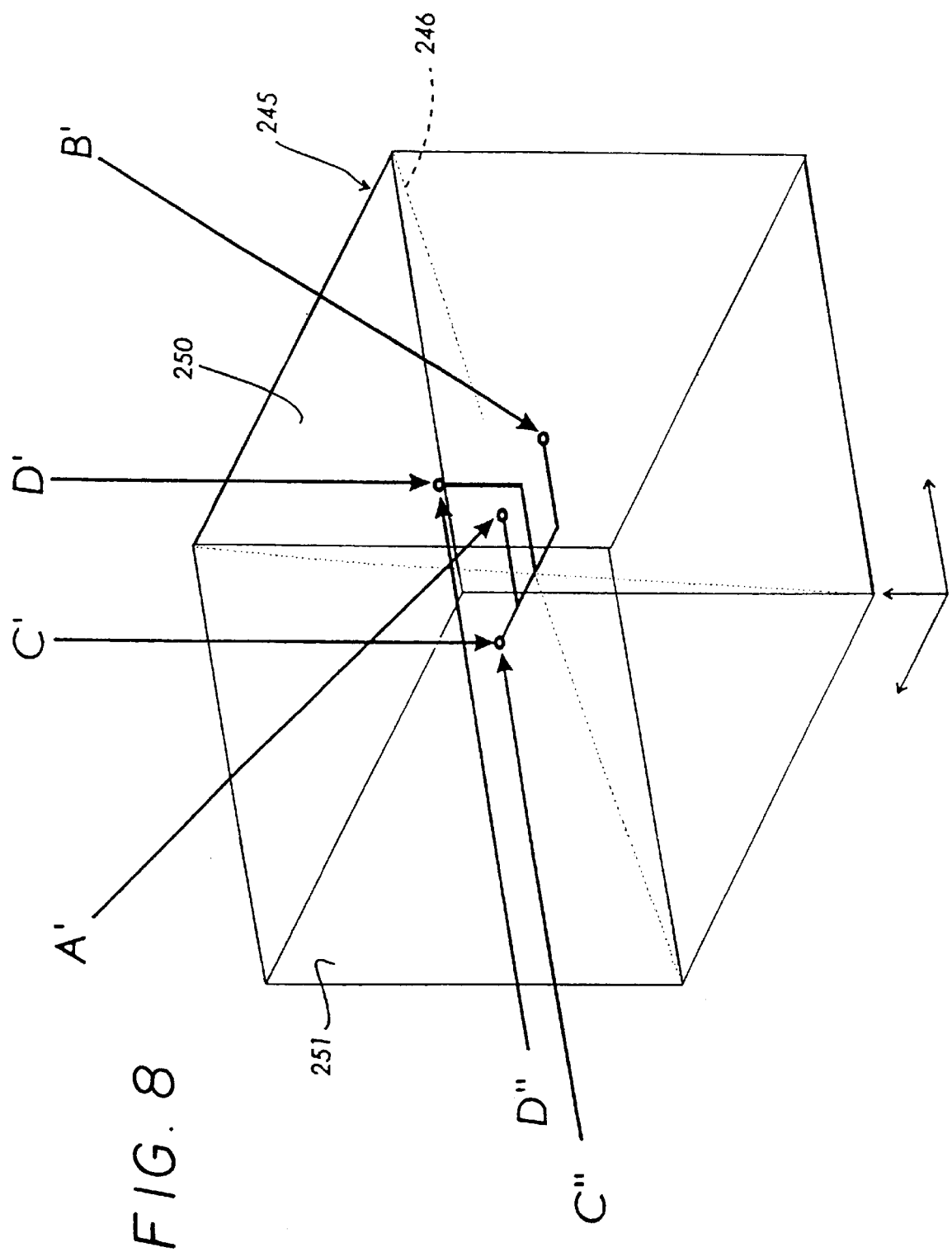

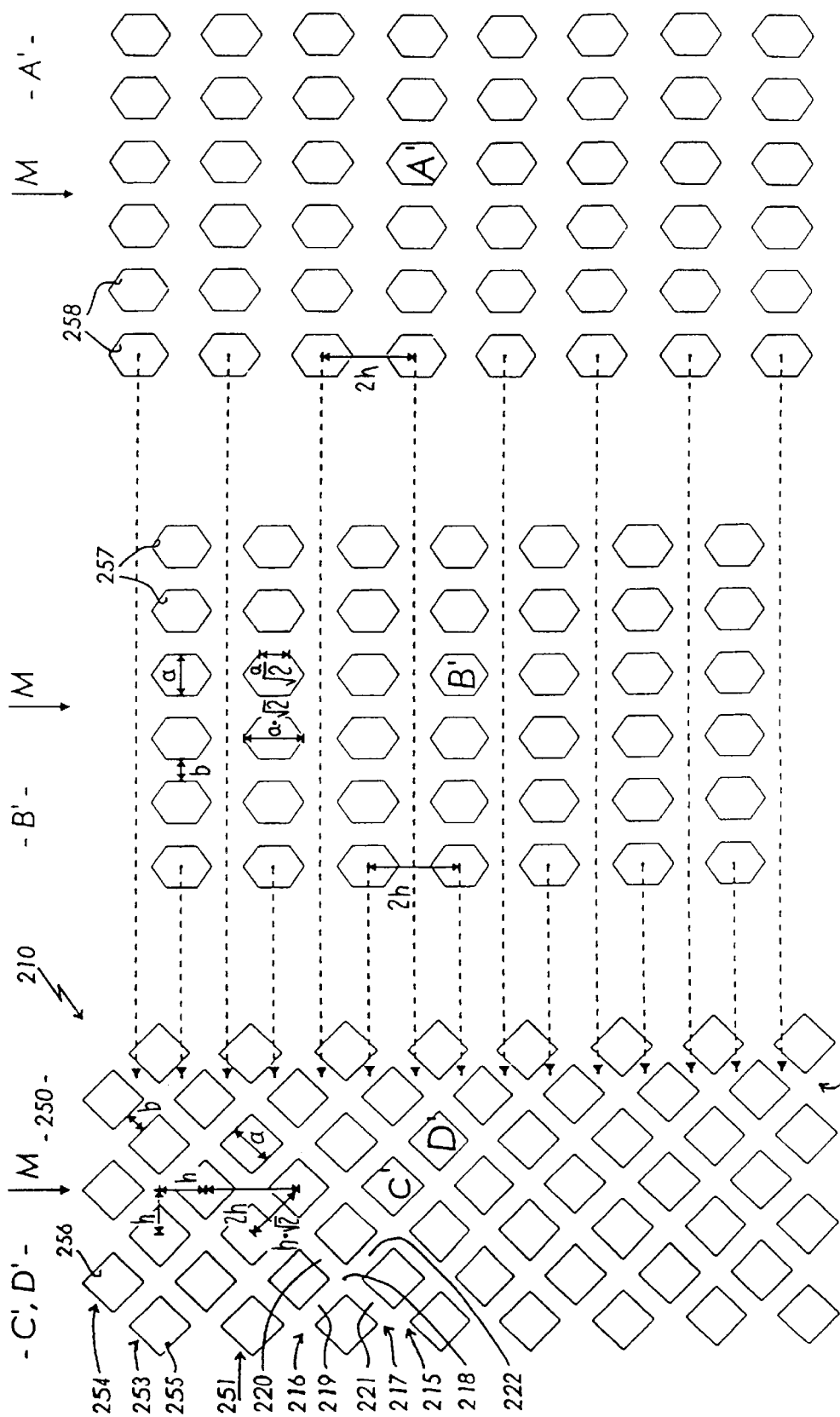

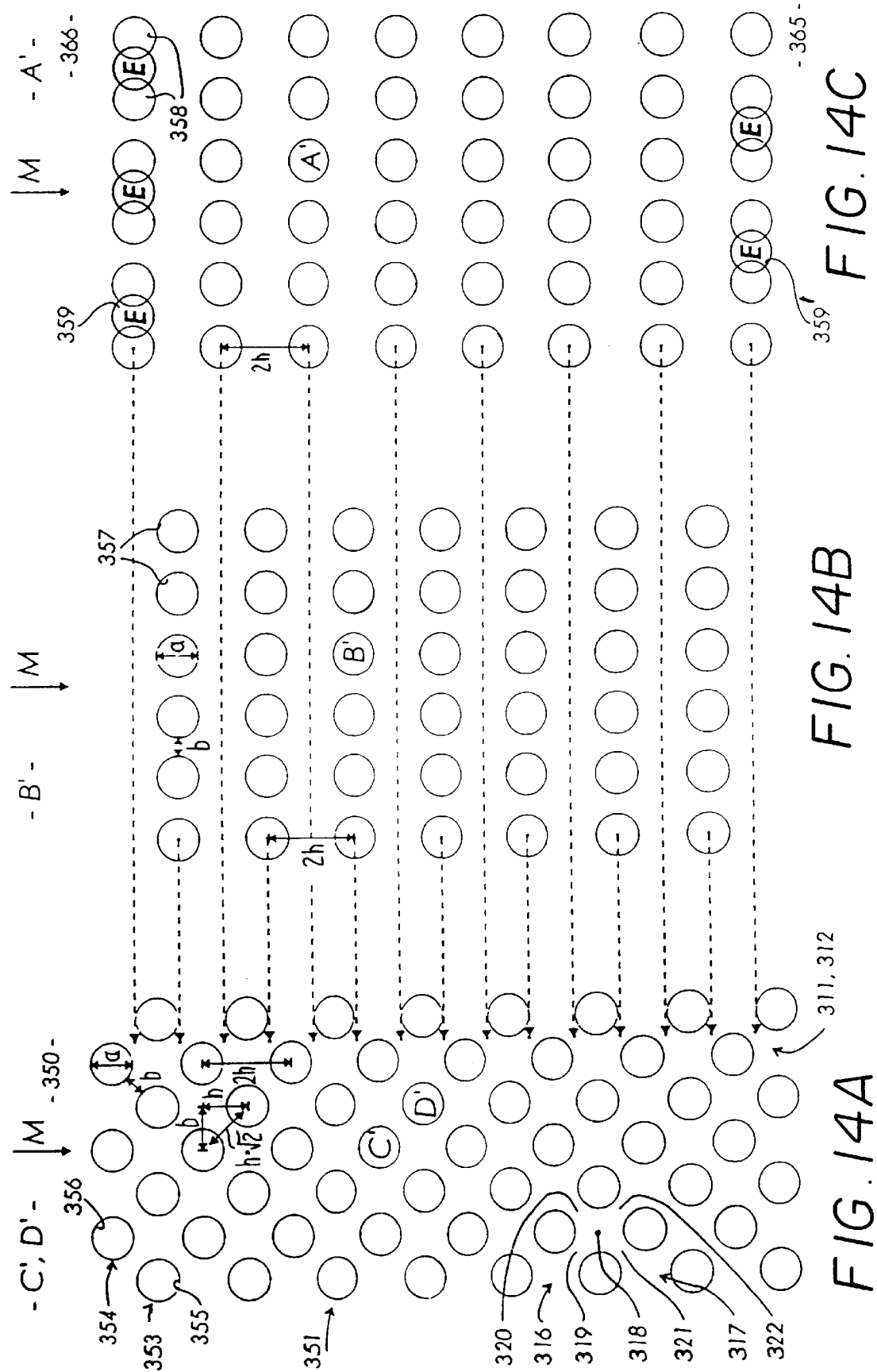

ELECTRODE ARRANGEMENT AND AN ELECTROCHEMICAL BATTERY PRODUCED THEREFROM AND A METHOD FOR THE MANUFACTURE THEREOF

CROSS REFERENCE TO RELATED APPLICATION

This application discloses subject matter in common with application, Ser. No. 08/983,521, filed on May 15, 1998.

FIELD OF THE INVENTION

The present invention relates to an electrode arrangement for an electrochemical device, such as batteries, electrochemical batteries or the like, to an electrochemical device constructed from such an electrode arrangement, and a method for the manufacture of an electrochemical device.

BACKGROUND OF THE INVENTION

By way of example, conventional lead-acid batteries are provided with at least two mutually opposing plate-shaped electrodes, which are either coated with $PbO_2$ gel, or modelled in the form of two lead plates one of whose plate surfaces is converted to $PbO_2$ after a Planté coating. In both cases, the reactive surface of the electrode corresponds to the plate surface and is therefore restricted to the dimensions of the latter. Furthermore, conventional lead-acid batteries have only limited mechanical stability on account of the plate-shaped design of the electrodes. While $PbO_2$ gel electrochemical batteries do supply high currents, they have a short service life. While in contrast, stationary batteries with Planté-coated electrodes do have a long service life, they cannot supply high currents because the reactive surface layer is small in relation to the complete electrode. Accordingly, the latter have a relatively high volume and a relatively high weight in relation to their power yield.

On these grounds, a great many attempts have been made to enlarge the surface area of the electrodes, as is to be seen, for example, from German Patents DE 42 01 420 A1, DE 26 39 881 A1 and DE-PS 146 063. While an enlargement of the surface is provided in all cases by means of sometimes relatively complicated design and manufacturing measures, there still remain the disadvantages of restricted mechanical stability and compared with the power yield, a relatively high volume and weight.

SUMMARY OF THE INVENTION

An object of the present invention is therefore to provide an electrode arrangement for cells of batteries, electrochemical batteries or the like electrochemical devices and an electrochemical device of the type mentioned at the outset manufactured with an electrode arrangement of this kind, which will satisfy present-day requirements for high storage capacities at comparatively low volume and weight and can thereby achieve a higher yield output. A further object of the present invention is to provide a method of manufacturing an electrochemical device of this kind which is neither labour-intensive nor cost-intensive.

The noted objects are achieved by providing an electrode arrangement wherein two electrodes are provided each having a three-dimensional grid-type structure and arranged interleaved with one another in all directions in space. Preferably, one of the grid-type structures of the electrodes is provided with an electrolytically separating intermediate wall in the separating plane of the other grid-type structure. And by providing a method which incorporates two mutually offset continuous recesses in at least two mutually perpendicular planes and in at least two planes offset therefrom by 45° of an unfinished body in order to obtain a three-dimensional grid-type overall structure, and by the opening up of the overall structure into at least two individual structures representing the electrodes or the electrode parts.

A development of the electrodes each as a spatial body which has a large surface area in relation to its own volume is achieved with the measures in accordance with the present invention. The volume of the spatial body can be so reduced in the process that, with the exception of a very small supporting component, the entire volume of the two electrodes of a cell is comprised of material involved in the electrochemical reaction. The two electrodes are spatially interleaved in such a way that the distances between the electrodes can become very small, thereby producing a great many cell-type reaction chambers in which the electrochemical reaction proceeds.

The features according to which the two electrodes are identical in structure and are preferentially held at essentially the same distance fro one another are provided in a preferred embodiment of the present invention which advantageously results in a large number of cell-type reaction chambers each being of equal size and preferentially in the distances between the spatial bodies of the two electrodes being essentially of identical size at each point or in each area. This results in uniform electrochemical reactions within the entire space of the electrode arrangement without any manner of preferential direction arising. This is also due to the fact that the entire space of an electrochemical device is occupied uniformly and in equal parts by the two electrodes. Accordingly, both electrode surfaces cut in every section through the space are equal in size.

A further advantageous embodiment envisages the features whereby each electrode is formed of several three-dimensional grid elements comprised of approximately vee-shaped, bar-type element-component pairs extending from a node in two mutually perpendicular planes. This means that the spatial body has a constantly repeating geometric shape comprised of a node with four bars projecting from same. Each of these bars remains constantly at the same angle in relation to each other bar. In accordance with one variant according to which the approximately vee-shaped, bar-type element-component pairs are connected next to and/or above one another by their respective ends at least in part to further element-component pairs or grid elements, beginning with one node, a further node is placed on the bars of same in each direction in such a way that the bars of the further node represent the continuation of the bars of the first node. This method produces an entirely regular spatial grid-structured body which is so modelled that a further body of the same kind can be intercalated in the spaces within that body. This intercalated body (the second electrode) does not come in contact with the first body (the first electrode) at any point. The distances between the intercrossing bars of both bodies are always within a constant tolerance.

In accordance with the features, in accordance with which the cross-sections of the bar-type element components can be uniform or non-uniform over their length, either one of which cross-sections being preferred as a function of the method of manufacture of the electrode arrangement with reference to manufacturing costs and production requirements.

In accordance with the features whereby the three-dimensional grid-type structure of te electrodes is constructed three-dimensionally interleaved by sections, it is possible for the electrode arrangement to have a structural design. A further useful development of the electrode design, which is at least suitable for certain sizes of such an electrochemical device, is provided by the features whereby the three-dimensional grid-type structure of the electrodes is formed, in an unfinished body, of mutually offset, through-going recesses in at least two mutually perpendicular planes and in at least two planes rotated through 45° in relation to same. Devices of almost any spatial form can be produced in this manner. Useful developments are provided by the features whereby the recesses are formed by drilled holes, are formed of square recesses from two mutually perpendicular directions and of hexagonal recesses from two mutually perpendicular diagonal directions and are preferentially cut by laser, wherein the separation of the electrodes is formed by at least partial separation of a wall plate on all sides of the unfinished body, or in that the electrodes are separated by removal, for example by drilling or for example by laser cutting of certain bars or by the production of separating recesses between the two electrodes.

Depending on the mechanical strength or admissible weight to be achieved, the question of materials is solved either in accordance with the features whereby the grid-type structure is plastic and is provided with an appropriate coating, or with those whereby the grid-type structure is a suitable metal.

In the majority of cases, electrochemical batteries or other electrochemical devices are comprised of several cells connected electrically in series. The features whereby at least one of the grid-type structures of the electrodes is separated in one plane, or whereby one of the grid-type structures of the electrodes is provided with an electrolytically separating intermediate wall in the separating plane of the other grid-type structure are provided in order that this can be achieved in a very simple manner, it then being very easily possible first, in the form of the aforementioned electrode arrangement, to provide two electrodes whose dimensions correspond to the sum of the individual cells to be provided. The spatial bodies of the two electrodes can then be separated by cuts, recesses or the non-provision of recesses or the like at any point in such a way as to produce several individual electrodes, it being sufficient to subdivide one of the two complete electrodes. The features whereby the intermediate wall is formed by insertion or casting of an appropriately shaped plate, or by not incorporating drilled holes or recesses in an appropriate plane of the unfinished body, or by the intermediate wall being part of one electrode and the electrode being separated preferentially by means of separating recesses from the intermediate wall on both sides adjoined by same can subsequently be provided so as also to provide a separation of the electrolytes provided within the individual cells. A further useful development is thereby produced with the features whereby the grid-type structure of the two electrodes is separated in planes each arranged at a distance from one another, with which a mechanical connection of the individual cells within the entire electrochemical device is also achieved.

The features whereby two mutually offset continuous recesses in at least two mutually perpendicular planes and in at least two planes offset therefrom by 45° of an unfinished body in order to obtain a three-dimensional grid-type overall structure and by the opening up of the overall structure into at least two individual structures representing the electrodes or electrode parts, or whereby before the opening up of the overall structure there is inserted an end plate and/or an intermediate plane made of electrically insulating material for the purpose of fixing the spacing of the electrodes or electrode parts, or whereby at least one of the grid-structure electrodes is opened up in an intermediate plane and in this plane there is inserted an intermediate wall extending over the entire cross-sectional area of the electrode arrangement, or whereby an electrolytically separating intermediate wall is formed by not incorporating recesses in an appropriate plane of the unfinished body and in that a separation of at least one of the electrodes into at least two electrode components is affected by removal of corresponding bar-type element parts, the bar-type element components being removed by incorporation of separating recesses, and the recesses are bored or cut by laser, used to manufacture an electrochemical device of this kind using the aforementioned electrode arrangement, provide an easy means of producing the spatially grid-structured bodies of the two electrodes from solid material and keeping them mechanically spaced apart by the insertion of walls, so that the two bodies remain fixed in relation to one another in space. Furthermore, a multi-cell construction may also be easily obtained by this means.

Further details of the present invention are to be taken from the following description, in which the present invention is more closely described and explained with reference to the embodiments represented in the drawings.

BRIEF DESCRIPTION OF THE DRAWINGS

FIG. 6 is a side view in the direction of Arrow VI in FIG. 5;

FIG. 7 is a top view in the direction of Arrow VII in FIG. 5;

FIG. 8 is a drilling pattern, represented with reference to a block-shaped unfinished body as initial workpiece, for the manufacture of an electrode arrangement for an electrochemical device, but in accordance with a third embodiment of the present invention;

FIG. 9 is a truncated representation of a top view, corresponding to FIG. 3 but diagrammatic, of the electrode arrangement in accordance with a third embodiment of the present invention;

FIGS. 11 and 12 are each in a truncated representation, a side view corresponding to FIG. 2 but diagrammatic and of two mutually perpendicular sides of the electrode arrangement for an electrochemical device in accordance with the third embodiment.

FIGS. 14A, 14B and 14C are truncated representations, corresponding to FIGS. 9, 11 and 12, of the fourth embodiment of the present invention.

DESCRIPTION OF THE PREFERRED EMBODIMENTS

The electrode arrangements 10, 110, 210 or 310 illustrate the four embodiments of the present invention in the form of spatial bodies which are in each case identical for each electrode 11 and 12, 111 and 112, 211 and 212 or 311 and 312. These electrode arrangements are used to construct a single-cell or multi-cell battery, electrochemical battery or other electrochemical device. The electrodes with spatially three-dimensional grid-type structure 11 and 12, 111 and 112, 211 and 212 or 311 and 312 are interleaved with one another in such way that they are at an essentially identical or uniform distance from one another in every area. Since in the embodiments represented, the two electrodes 11 and 12, 111 and 112, 211 and 212 or 311 and 312 are each of identical structure, it is sufficient in itself to describe the structural design of the electrodes with reference in each case to one electrode 11 or 12, 111 or 112, 211 or 211 and 311 or 312.

Figure 1:
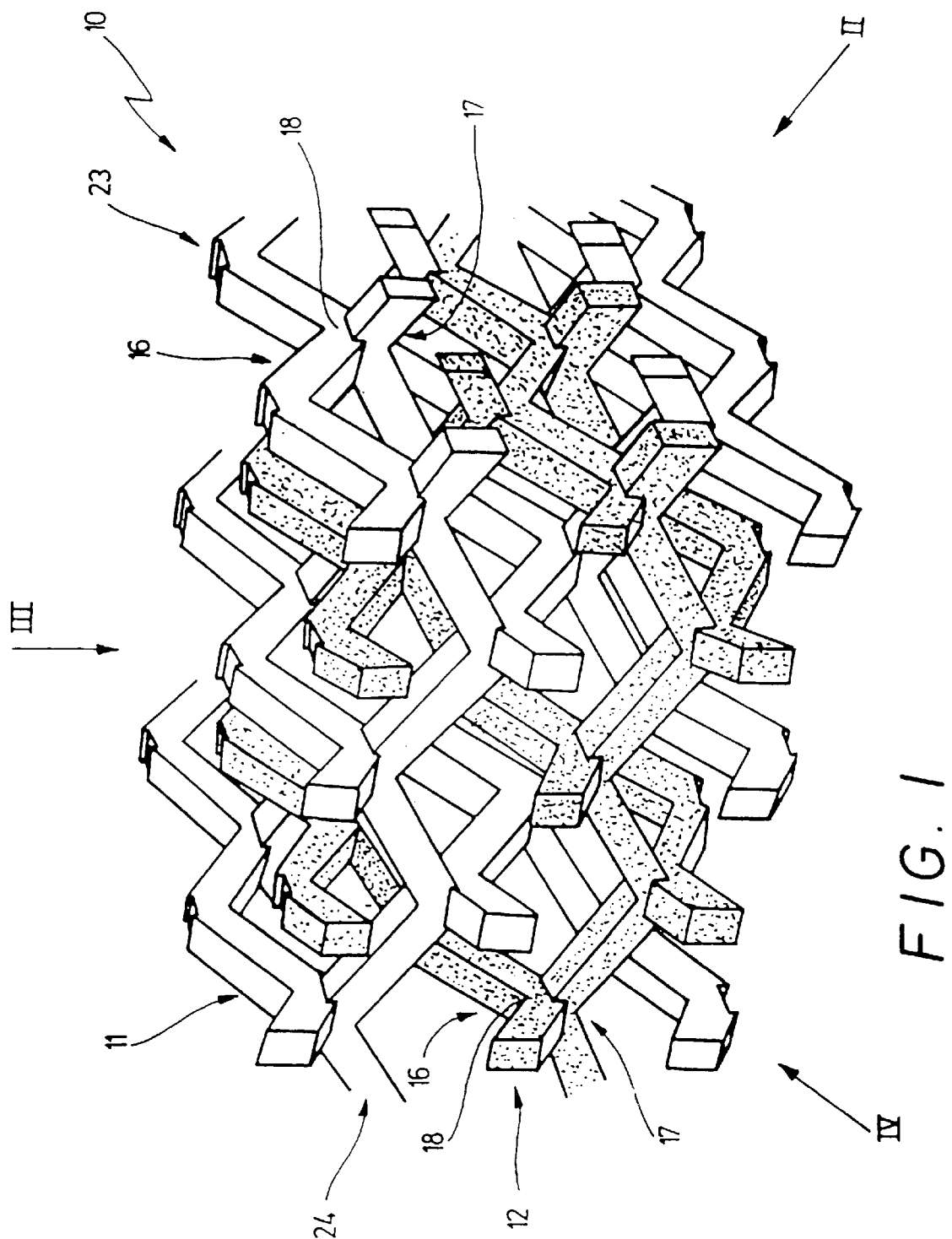
FIG. 1 is a partially truncated perspective representation of an electrode arrangement for an electrochemical device in accordance with a first embodiment of the present invention.
Figures 1A, 2:
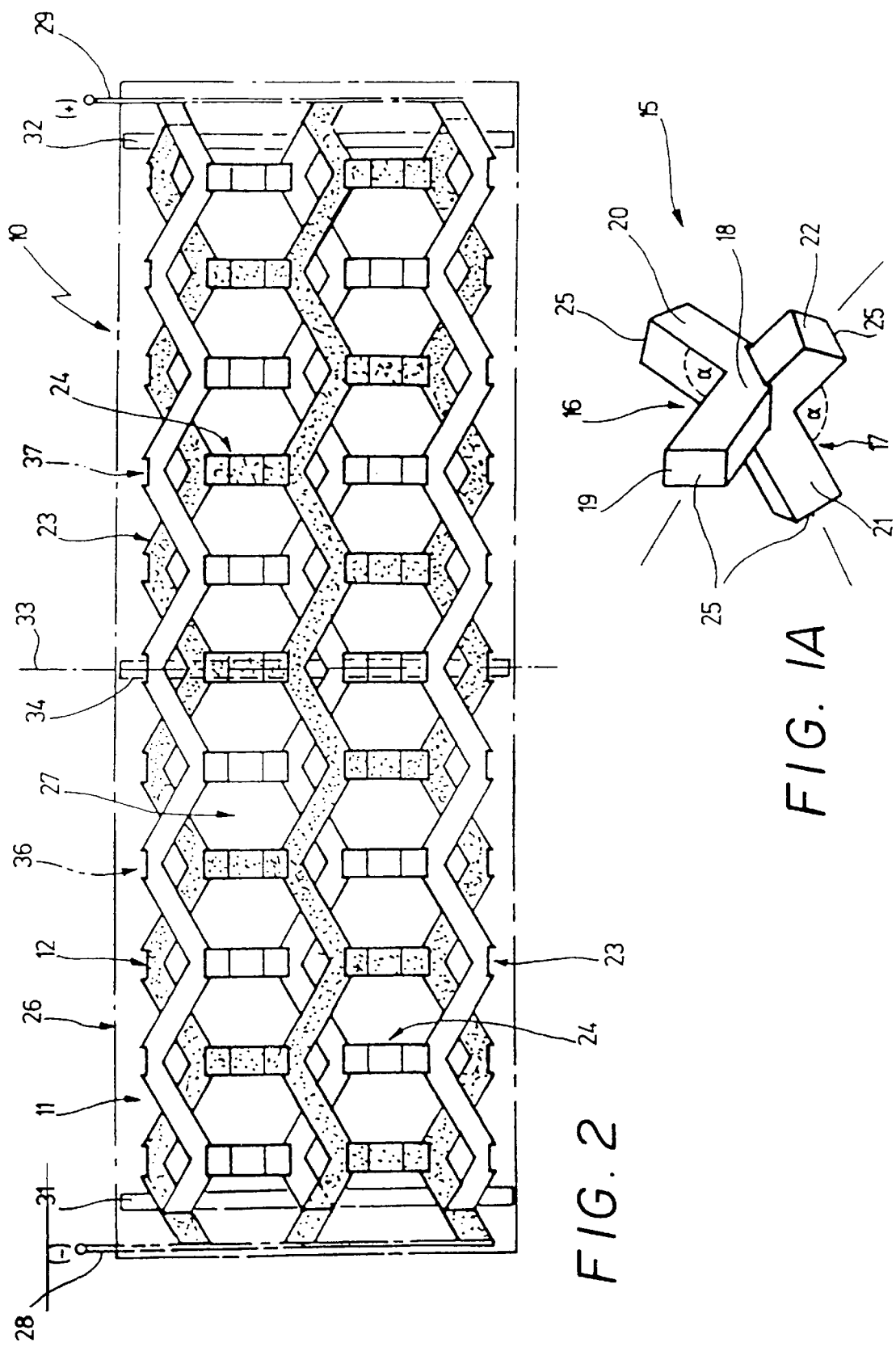
FIG. 1A is an enlarged perspective representation of a grid element of one of the electrodes of the electrode arrangement in accordance with FIG. 1.
FIG. 2 is a side view in the direction of Arrow II in FIG. 1, but marked in a dot-and-dash pattern and diagrammatically extended to constitute an electrochemical battery.
Figure 1B:
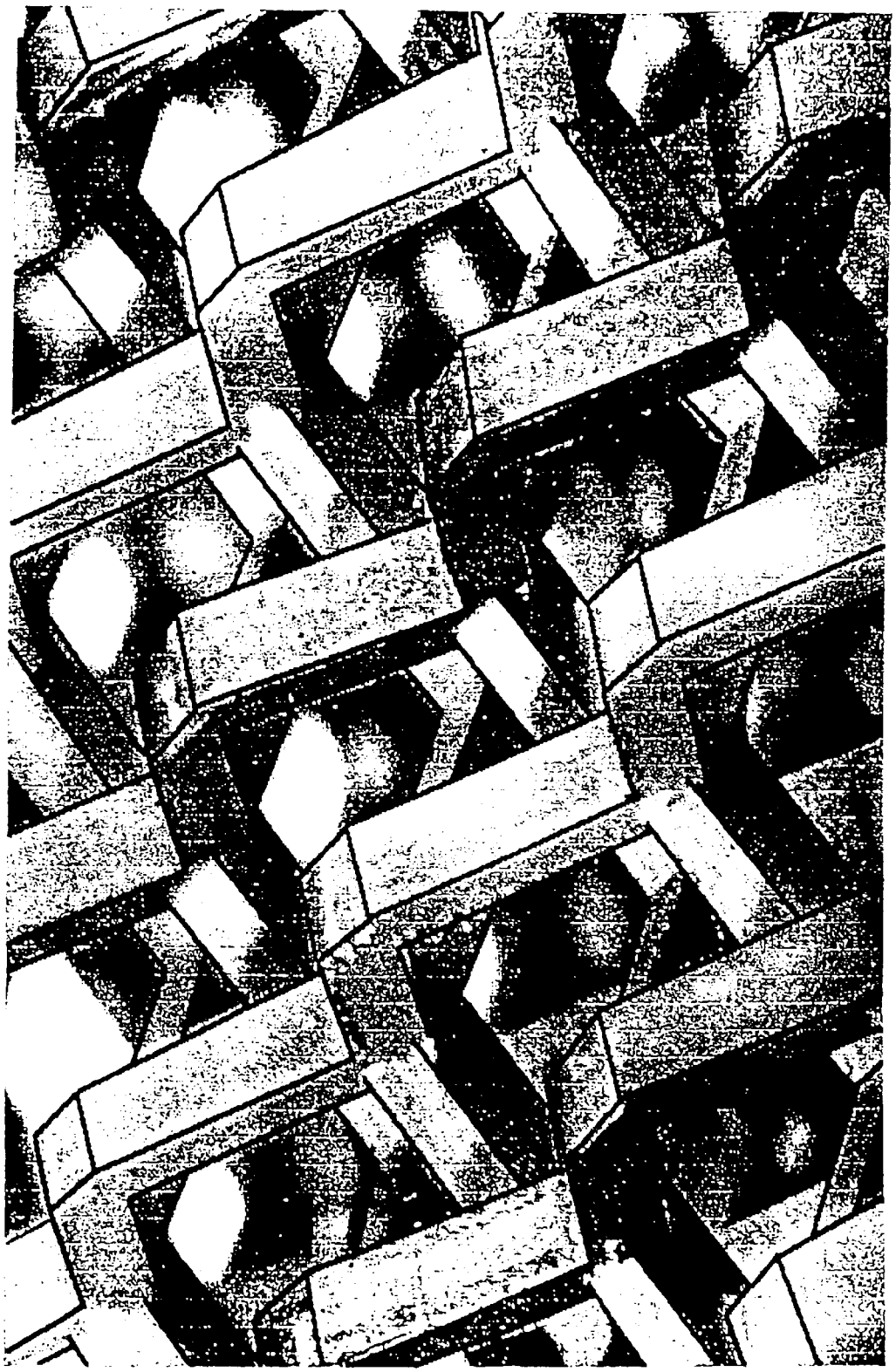
FIG. 1B is an enlarged sectional representation corresponding to FIG. 1.
Figure 3:
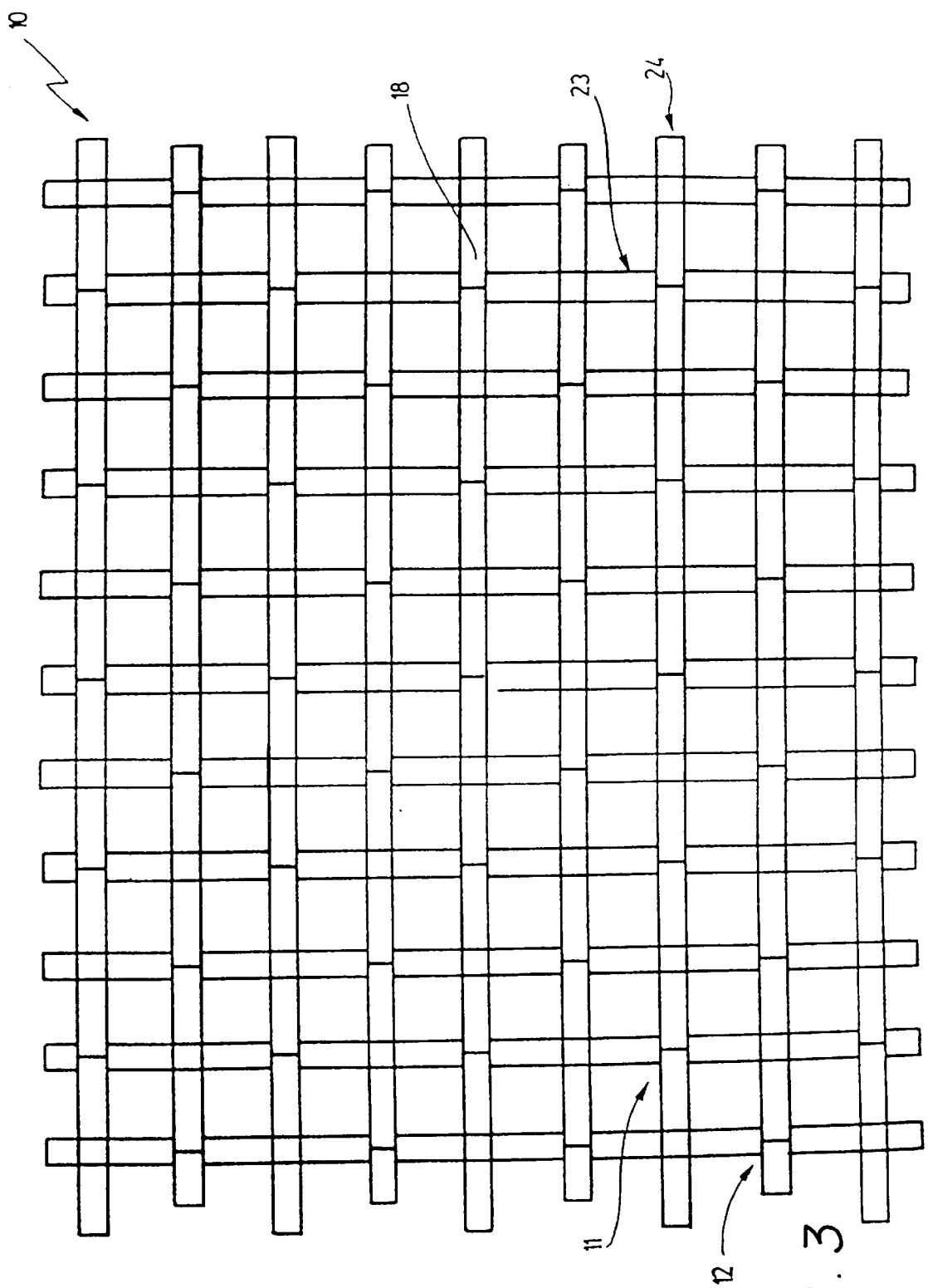
FIG. 3 is a top view in the direction of Arrow III in FIG. 1.
Figure 4:
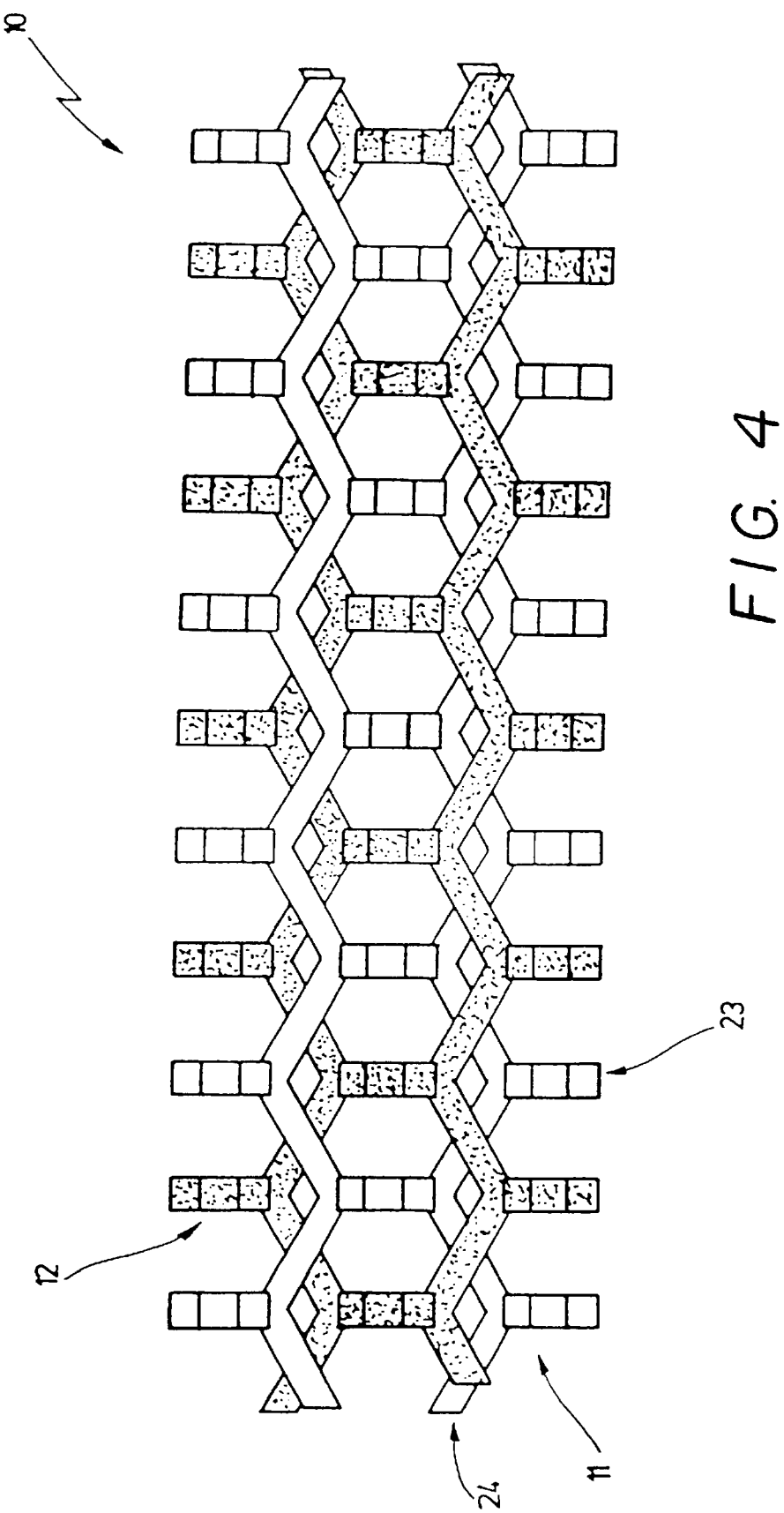
FIG. 4 is a side view displaced 90° in relation to FIG. 2 in the direction Arrow IV in FIG. 1.

In the embodiment of the electrode arrangement 10 represented in FIGS. 1 to 4, the electrode 11 (and in accordance with the foregoing, also the electrode 12) is constructed of a great many grid elements 15, each grid element being formed, in accordance with FIG. 1A, of two approximately vee-shaped element-component pairs 16 and 17 which lie in mutually perpendicular planes and are connected convergingly with one another at a nodal point 18. Each vee-shaped element-component pair 16, 17 has two identically developed bar-like element components lying in the same plane, 19 and 20 or 21 and 22 respectively, each of which extends in opposite directions from the nodal point 18 at a given angle α. The grid element 15 can be viewed as a symmetrically radial formation, whose nodal point 18 forms the center point of a cube and whose bar-type element components 19 to 22 extend to respectively diagonal corners of several cube surfaces. Accordingly, the bar-type element components 19 to 22 of the element-component pairs 16 and 17 extending from the nodal point 18 are each at the same angle in relation to one another and are of the same length. In the embodiment represented, the cross-section of the bar-type element components 19 and 20 or 21 and 22 is square; however, any other cross-section can be chosen, for example a round or a hexagonal cross-section. The ends 25 of the bar-type element components 19 to 22 are each connected to or in one piece with ends of adjoining bar-type element components of further grid elements 15, so that the (spatial) three-dimensional grid-type structure is produced form a great many grid elements 15 arranged under, above and beside one another. It is understood that the choice of the number of grid elements 15 in the three directions of the space is dependent on the desired external dimensions of the electrode arrangement 10. As mentioned above, the electrode 12 is constructed in the same, identical manner.

The interleaving of electrodes 11 and 12 in all directions in space to form electrode arrangement 10 is effected in this embodiment either in such a way that each of the individual grid elements 15 of the electrodes 11 and 12 are first interleaved three-dimensionally and are then connected with the adjoining grid elements 15 each likewise interleaved three-dimensionally. The electrode arrangement 10 can also be constructed in such a way that one electrode 11 or 12 is first constructed with its grid structure and that vee-shaped element-component pairs 16 and 17 joined together in a row are then separately manufactured, these being threaded three-dimensionally, as longitudinal and transverse rows 23 and 24 forming the respective other electrode 11 or 12, into the grid structure of the one electrode 11 or 12 and then connected to one another. To keep the grid electrodes 11 and 12 at the envisaged distance, end plates 31, 32 are cast in electrically insulating plastic, closely enclosing the bars 21 to 22, for example in the vicinity of opposing ends of the electrode arrangement 10 and as represented by way of example in FIG. 2 only.

To manufacture an electrochemical system, for example a battery or an electrochemical battery, the electrode arrangement 10, as suggested in dot-and-dash pattern in FIG. 2 for example, is encompassed by an enclosure 26 and the interior 27 of the electrode arrangement 10 is filled with a liquid or solid electrolyte. If the electrochemical battery is formed solely of one cell bounded, for example, by four end plates 31 and 32, the two grid-type (positive and negative) electrodes 11 and 12 are each provided with an electrical connection 28 and 29 respectively.

If the electrochemical device, for example a battery or an electrochemical battery, to be manufactured from the electrode arrangement 10 is to be constructed of two or more cells, this can easily be done by separating at least one of the grid-structured electrodes 11 or 12 in one, two or more planes, as is represented in dot-and-dash pattern by the separating plane 33 in FIG. 2, and placing the ends at a distance. An intermediate wall 34 shown in dotted pattern is inserted at this separating plane 33 to separate the two cells physically and electrolytically. The wall 34 can be comprised of electrode material or of electrically insulating material, for example plastic, and closely encloses the bar-type element components 19 to 22 of the other electrode 12, thus producing an impervious separation between the two cells, for example, for the electrolyte. Each electrochemical-battery cell thus possesses two individual electrodes 36 and 37 modelled from the complete electrode 11, and the electrode 12 still developed as complete electrode. It is understood that the two electrochemical-battery cells are joined electrically in series by appropriate electrical connections.

Instead of the "vertical" separation represented in the dot-and-dash pattern in FIG. 2, the electrochemical device can also be separated "horizontally" into two or more cells. If the electrodes 11 and 12 are increased in size or constructed further upward as shown in FIG. 2 in such a way that in electrode 12, for example, an arrangement of transverse rows 24 is omitted from above the top longitudinal rows 23 and if a separating wall, horizontal in this case, in electrically conductive material is fitted in this plane, integrated in all directions of space with an electrode 11 constructed without an omitted row, there are produced two adjoining cells, electrolytically separated from one another, to which the electrode 11 is common and in which two individual electrodes have been produced from electrode 12.

As a result of a layered structure of this kind, the separating wall (or separating walls) can be of the same material as the electrode in question, so that imperviousness is provided automatically and the separating wall is simultaneously available as an active surface.

It is understood that the respective other electrode or indeed both can also be separated in a corresponding manner. Where there are several individual cells in an electrochemical battery, it is appropriate to separate the two electrodes 11 and 12 in such a way that the separating planes of the individual electrodes 11 and 12 are each arranged at an offset from one another, so that in each case one of the individual electrodes is assigned to two adjoining cells.

The material of the grid elements 15 or the electrode 11 and 12 can be constructed in a manner known per se. For example, the grid elements 15 can be moulded from plastic and coated with an appropriate metal suitable for electrochemical devices. It is also possible, however, to model the individual grid elements 15 from lead and for example, to prepare one of the electrodes by means of a Plante coating. Irrespective of the material used, the grid structure of the elements 11 and 12 provides relatively high mechanical strength, satisfying all requirements, in the electrode arrangement 10 and the electrochemical device produced therefrom.

Figure 5:
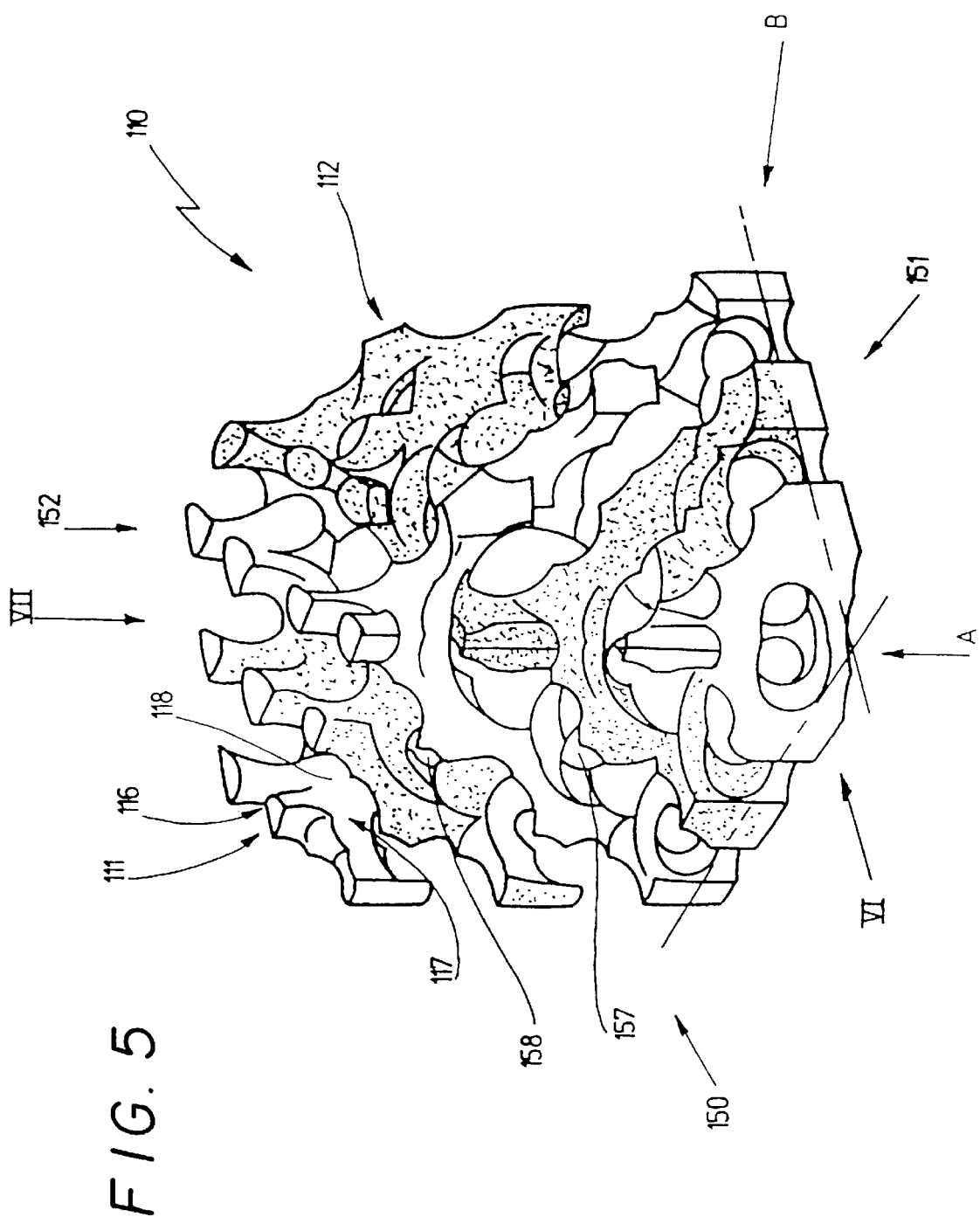
FIG. 5 is a partially truncated perspective representation of an electrode arrangement for an electrochemical device in accordance with a second embodiment of the present invention, with the two electrodes not yet completely separated.

In the embodiment of the electrode arrangement 110 represented in FIGS. 5 to 7, the three-dimensional grid-type structure of the electrode 111 and 112 is indeed modelled likewise in uniform development and respective juxtaposition of individual grid elements 115 constructed of bar-type element components 119 to 122, but because of the special manufacturing process, their vee-shaped element-component pairs 116 and 117 joined to the nodal points 118 are not uniform in cross-section.

In this embodiment, the electrode arrangement 110 is produced, for example, from a longitudinally extended, block-shaped material, such as bar stock material. Depending on the final shape of the electrochemical device to be achieved, however, the raw material or the unfinished body can have any kind and size of geometric shape adapted to this desired final shape, in other words any form of irregular shape. By way of simpler representation, the manufacture of the electrode arrangement 110 is herein described with reference to a cube. The cube is provided from three mutually perpendicular sides, for example from sides 150, 151 and 152, with several rows 153 and 154 each of throughgoing drilled holes. The adjoining rows of drilled holes 153 and 154 are provided besides with drilled holes 155 and 156 from each side 150 to 152 in such a way that the drilled holes 155 and 156 of adjoining rows of drilled holes 153 and 154 are arranged at an offset from one another. In other words, the drilled holes 155, 156 of respectively adjoining rows of drilled holes 153, 154 lie likewise in one row viewed in a diagonal direction across each side of the cube. As a result, the individual, respectively throughgoing drilled holes 155 and 156 of all three sides 150 to 152 penetrate one another in correspondingly offset manner. Furthermore, drilled holes 157 and 158 are incorporated in several parallel rows from two mutually perpendicular diagonal directions A and B, i.e. at an angle of 45° in relation to side 150 and 151 on the one hand and to side 150 and a side 162 facing opposite side 151 on the other hand, the rows of the one diagonal direction A also being arranged at an offset from those of the other diagonal direction B.

Under a particular condition, it is sufficient to drill the raw material or unfinished body from two mutually perpendicular planes and from two mutually perpendicular diagonal directions, for example the directions A and B, namely if the diameter of the drilled hole is still large enough to separate the electrodes from one another. As a prerequisite for the foregoing, the drilled holes must each have the same diameter d. In other words, d must be >h/√2, h being half the distance between the center points of two drilled holes 155, 156 adjoining one another over a node 118 (FIG. 6). If, on the contrary, d is substantially smaller, it will be necessary to drill from more sides or diagonal directions.

The grid-type electrodes 111 and 112 are produced as a result, separated from one another and held together at a uniform distance by side-wall plates, of which only the side-wall plate or in this case the bottom plate 160 remains visible in FIGS. 5 and 6. The other side-wall plates are already cut in such a way as to leave semi-cylindrical drilled sections 163 at the sides of the electrodes arrangement 110 still referable to as an unfinished blank.

As mentioned, the bars 119 to 122 of the grid elements 115 have a uniformly altering cross-section. The cross-section can be evened out by incorporating further rows of drilled holes at 45° in relation to the top side 152 from one or two mutually perpendicular directions. It is possible in this manner to work towards a standardisation of the distance between electrodes 111 and 112 in all areas.

If the bottom plate 160 were also to be separated in the plane 161 represented in dot-and-dash pattern, the two grid-structured electrodes 111 and 112 could move in relation to one another within their interleaved arrangement. To prevent this, the base plate 160 is not separated until, in order to construct an electrochemical device, for example a battery or an electrochemical battery, an electrically insulating end plate (corresponding to the end plates 31, 32 in FIG. 2) is attached to at least one end, to hold the two electrodes 111 and 112 interleaved in all directions of space or three-dimensionally in mechanically stable manner and at the stipulated distance.

A corresponding electrochemical battery is modelled from the electrode arrangement 110 in a manner represented in the embodiment in FIGS. 1 to 4, in that the electrode arrangement 110 is enclosed by an enclosure in a manner not represented, which is provided on at least two mutually facing sides with the electrically insulating end plate. It is understood that in this case also, an electrical connecting arrangement is led from the enclosure, connected under electrical insulation to the one electrode 111 and to the other electrode 112.

It is also readily possible in this embodiment to subdivide the electrochemical device into two or more cells by electrically separating the grid-structured electrode 111 and/or 112 into individual electrodes by mechanical separation in a desired plane. Intermediate walls can be provided in a corresponding manner to separate the two or more cell chambers.

In this embodiment, it is appropriate to provide a metal suitable for electrochemical devices as raw material, for example lead, one of the electrodes 111 or 112 then being provided with a Plante coating. It is also possible, however, first to produce the grid structure of the electrodes 111 and 112 from another material, such as plastic, which is then coated with a corresponding material suitable for the electrochemical device.

In the embodiments, the end walls can be manufactured from a plastic which possesses the appropriate chemical properties (acid resistance, strength). The end wall can be attached by immersing the electrode arrangement, whose electrodes are still connected to spacers or to the non-separated side walls and thereby fixed in place, so far into a liquid that the surface level of the liquid coincides with what will now become the bottom edge of the end wall being produced. The plastic material for the wall is cast onto this liquid. Once the walls at the head ends have been produced, the side walls or spacers can be respectively separated or removed. The part electrodes are already fixed in place by the inserted plastic walls. Since plastic walls are cast onto the sides, the head ends of the arrangement thus produced can each be connected with the one and with the other electrode, thus representing the two poles of the sequence of cells or cell.

Figure 10:
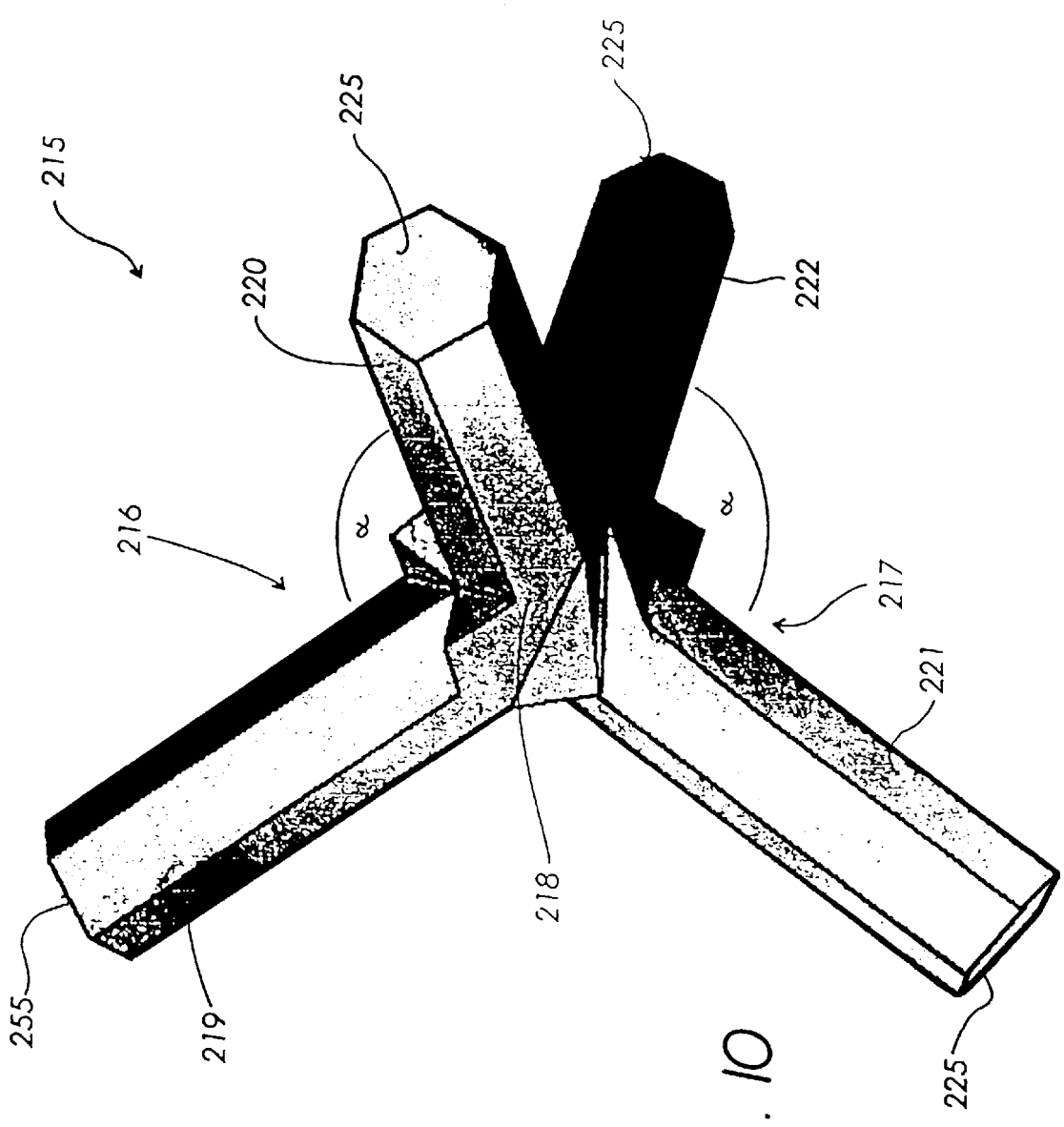
FIG. 10 is an enlarged perspective representation of a grid element of one of the electrodes of the electrode arrangement in accordance with the third embodiment.

In the third embodiment of an electrode arrangement 210 represented in FIGS. 8 to 12, the grid-type structure of the electrodes 211 and 212 is likewise modelled in uniform development and respective juxtaposition of individual grid elements 215 constructed of bar-type element components 219 to 222, whose vee-shaped element-component pairs 216 and 217 joined to the nodal points 218 are uniform in cross-section on account of a manufacturing process somewhat difference from the embodiment in FIGS. 5 to 7, as provided for in the embodiment in FIGS. 1 to 4 and shown in FIG. 10.

In this third embodiment, the electrode arrangement 210, like the electrode arrangement 110 in FIGS. 5 to 7, is manufactured from an unfinished body of any geometric shape and size. For the sake of simplicity, the foregoing is represented with reference to the block-shaped unfinished body 245 in FIG. 8.

The block-shaped unfinished body 245 is provided from two mutually perpendicular sides 250 and 251 in directions C' and D' or C" and D" respectively with several rows 253 and 254 each of throughgoing recess 255 and 256, which are square in this case (see FIG. 9, which also represents the view from direction C", D" onto the surface 251). The adjoining rows of recesses 253 and 254 are provided from each side 250 and 251 with square recesses 255 and 256 in such way that the recesses 255 and 256 of adjoining rows of recesses 253 and 254 are arranged at an offset from one another. Furthermore, as in the second embodiment in accordance with FIGS. 5 to 7, recesses 257 and 258 are incorporated in several parallel rows from two mutually perpendicular diagonal directions A' and B', i.e. at an angle of 45° in relation to side 250 and 251 on the one hand and to side 250 and a side facing opposite side 251 on the other hand, the rows of the one diagonal direction A' also being arranged at an offset from those of the other diagonal direction B', as is shown in FIGS. 11 and 12. These recesses 257 and 258 are developed hexagonally. All these recesses 255 to 258 are cut into the unfinished body 245 by means of a laser, for example.

As is shown in FIGS. 9, 11 and 12, this arrangement of the recesses 255 to 258 produces the individual nodes 218 and the bars 219 to 222 outgoing from same, whose cross-section, with the exception of the areas immediately adjoining the nodal points 218, is of a regular hexagonal shape (FIG. 10). In this embodiment also, the minimum number of planes or directions from which the recesses 255 to 258 need to be incorporated is determined by the cross-sectional area of the recesses. For example, if one side of the square recesses 255 and 256 is designated a and if the hexagonal drilled holes 257 and 258 have a narrow side in size a, the condition necessarily applying is half the distance h between the recess middle points of two recesses 255 adjoining one another over a node 218 (FIG. 9), namely a >h/√2. The connecting lines between FIG. 9 and FIGS. 11 and 12 sow on the one hand the offset arrangement of the recesses 255 to 258 and on the other hand the assignment of the middle points of the recesses 255 to 258 to the centers of the bars 219 to 222. In all three geometric axes, there is an advance of 2 h from one recess to the respectively adjoining one in the same direction A', B', C', D', C" or D". Furthermore the arrows M in FIGS. 9, 11 and 12 show the assumed middle of the electrode arrangement 210 provided with electrodes 211 and 212 interleaved in all directions in space.

In this embodiment, the electrodes 211 and 212 are separated from one another preferentially in such a way that the sides of the unfinished body are provided with corresponding halved recesses in continuation of the recesses 255 to 258, which results in a separation of the electrodes, as is also made clear with reference to FIG. 6 of the second embodiment, if the side-wall plate 160 therein were not cut off but provided with drilled half holes at corresponding points. The electrolytically separating intermediate walls in the unfinished body in accordance with the third embodiment in FIGS. 8 to 12 can be provided therein by providing no recesses 255 to 258 in a plane of the unfinished body 245 intended for the separating wall. This can readily be done by laser cutting technology. The necessary separation of at least one of the electrodes 211, 212 is effected in this embodiment by separation of particular bars of the electrode.

In this third embodiment also, as in the fourth embodiment in accordance with FIGS. 13 and 14 which remains to be described, the raw material of the unfinished body 245 can be of any kind, as has already been described with reference to the second embodiment.

In the third embodiment of the present invention, the individual recesses can also be produced by clamping the unfinished body 245 in accordance with FIG. 8 after producing the recesses in the directions C', D' and C", D" at both sides of an imagined diagonal drawn here as a dotted line and turning it about this diagonal line in three stages at an angular spacing of 120° in each case. After each 120° turn, the recesses are incorporated in accordance with directions A' and B'. If this method of incorporating the recesses is effected with cylindrical recesses in the form of drilled holes, the diameter or the outer circumference of the bar-type element components 219 to 222 between the nodal points 218 becomes standardised.

Figure 13:
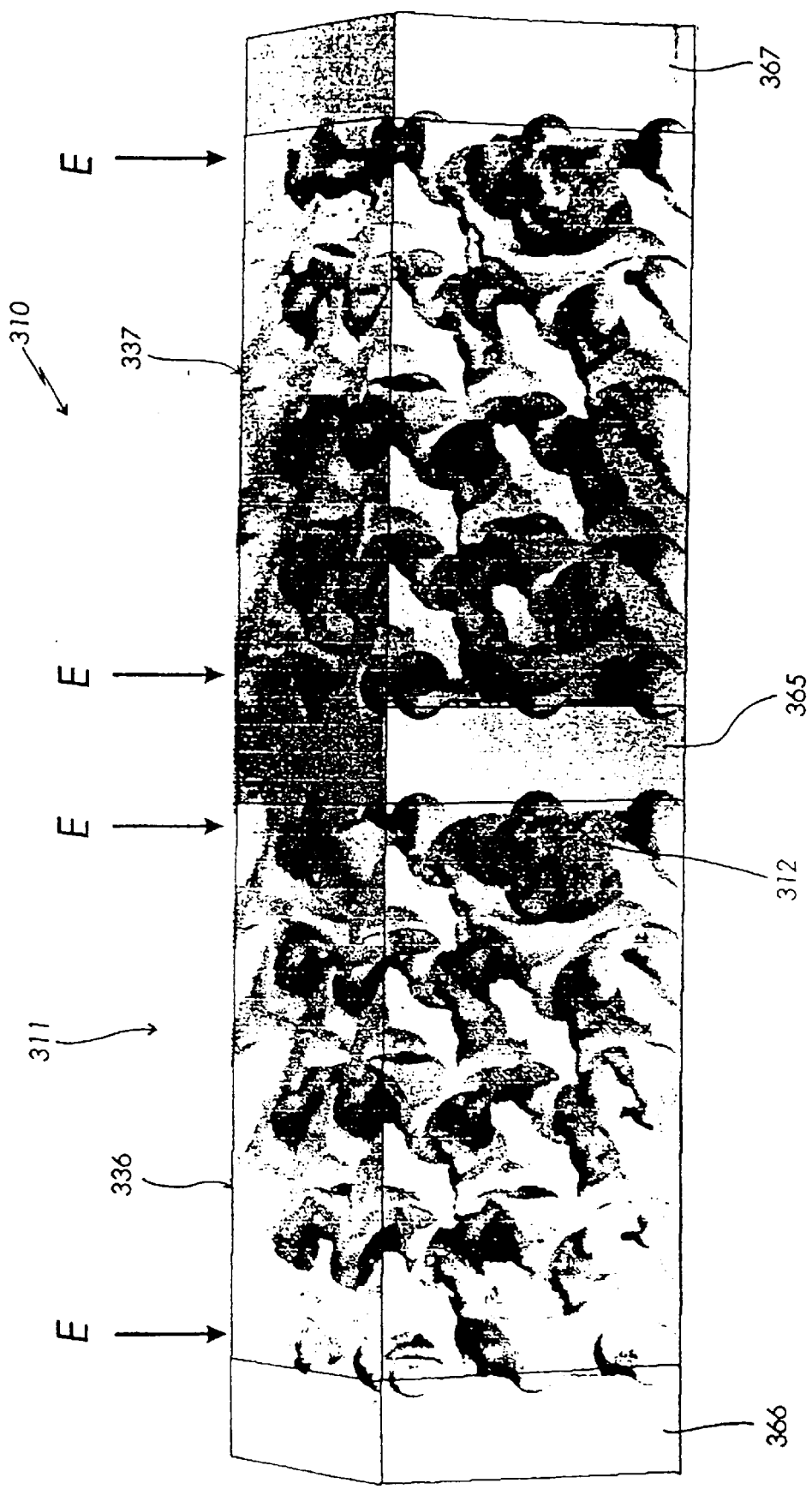
FIG. 13 is a perspective representation of an electrode arrangement produced from a longitudinally block-shaped unfinished body for an electrochemical device in accordance with a fourth embodiment of the present invention.

In the fourth embodiment of an electrode arrangement 310 represented in FIG. 13 and part in FIG. 14A to 14C, the grid-type structure of the electrodes 311 and 312 is developed in accordance with the embodiment in FIGS. 5 to 7. In other words, in the fourth embodiment, the recesses 355 to 358 of rows of recesses 353 to 354 are comprised of drilled holes which are cylindrical in cross-section. The essential difference between this fourth embodiment 310 and the aforementioned second embodiment lies in the multi-cell construction of the electrochemical device formed by the electrode arrangement 310.

The initial body is a longitudinally extended block in this case also, similar to the unfinished body 245 in FIG. 8. Corresponding to the drilling pattern therein represented, the rows 353, 354 of cylindrical recesses 355 to 358 are incorporated in the directions A', B', C', D", C" and D" therein represented. These rows of recesses are so arranged, as shown in FIG. 13, as to produce end walls 366 and 367 and a cell separating wall 365. The cell separating wall 365 is produced by means of a relative non-cutting feed of at least 3 h between the tool for manufacture of the rows of recesses and the workpiece (unfinished body). The same applies to the manufacture of the end walls 366 and 367, which can be executed with thinner walls on account of their even outer surface.

To separate the electrodes 311 and 312 from one another and to separate the one electrode 311 into two individual electrodes 336 and 337, cylindrical separating recesses 359 and 359' are incorporated from direction E (FIG. 14C) in parallel with direction A' (FIG. 8) at both sides of the cell separating wall 365 and at the inside area of the end walls 366 and 367, each of these recesses being arranged between two adjoining drilled holes 358 of adjoining pairs of drilled holes and intersecting these drilled holes 358. It can clearly be seen from FIG. 14C that on incorporation of the separating drilled holes 359 and 359', the bars 319 to 322 remaining between adjoining drilled holes 358 are worked out or disappear.

In accordance with FIG. 14C, the separating drilled holes 359' are offset besides in relation to the drilled holes 359 when an even number of rows of drilled holes 358 is located between the rows of drilled holes provided with the separating drilled holes. In accordance with FIG. 13, this method produces at left and right the end-wall 366 and 367 incorporating individual electrodes 336 and 337 of the electrode 311 and the electrode 312, at whose central area is the cell separating wall 365 at both sides of which the grid-type structures are interleaved in all three directions in space with the grid-type structure of the individual electrode 336 or the individual electrode 337. FIG. 14 is otherwise directly comparable in all further details and in the arrangement of the recesses (drilled holes) with FIGS. 9, 11 and 12, FIG. 14 likewise simultaneously representing the view from the direction C", D" onto the surface 351.

In the representation embodiments of the electrode arrangement 10, 110, 210, 310, the ratio of the electrode volume to the volume of the cell and therefore of the electrolytes is determined by the ratio of bar cross-section or bar diameter to bar height or bar length respectively. As a result of the geometrically uniform shape of the two electrodes 11 and 12, 111 and 112, 211 and 212 or 311 and 312, the entire space of the cell or each of the cells is taken up uniformly and in equal proportions by both electrodes.

As a result, the proportion of the reactive part of the electrodes is very large by comparison with the remaining supporting component. The reduction in the non-active material of the electrode results in a reduction in weight, a uniform electrode shape and a uniform current density. The enlargement of the surface area on account of the possible smallness of the hole system or the grid structures facilities high current consumption.

Especially in the second, third and fourth embodiment of the electrode arrangement 110, 210 and 310 respectively, the manufacturing process produces a planar take-off point for current supply.

An essential feature of the electrode arrangement 10, 110, 210 or 310 is the spatially three-dimensional grid-type structure comprised of the electrodes arranged to interleave in all directions in space, asymmetrical grid structures also being possible.

Although no detailed reference has been made in the above to the electrochemical side of an electrochemical device, it is understood that the electrode arrangement 10', 110, 210 or 310' and the electrochemical device produced therefrom are prepared in an appropriate manner and provided in a usual manner not alone structurally but also in material terms with the appropriate elements such as electrolytes, electrical connections and the like.

What is claimed is:

1. An electrode arrangement for electrochemical batteries comprising:
    two electrodes each having a three-dimensional grid structure, which are held spaced apart from one another, said electrodes being arranged interleaved with one another in all directions in space.

2. The electrode arrangement as defined in claim 1, wherein said two electrodes are identical in structure and are held at a given distance from each other throughout the extent of said two electrodes.

3. The electrode arrangement as defined in claim 1, wherein each electrode is formed of a plurality of three-dimensional grid elements, each comprised of a node and vee-shaped, bar element-component pairs extending from said node in two mutually perpendicular planes.

4. The electrode arrangement as defined in claim 3, wherein said vee-shaped, bar element-component pairs each define an end, and wherein said vee-shaped, bar element-component pairs are connected next to and/or above each other at their respective ends.

5. The electrode arrangement as defined in claim 3, wherein said vee-shaped, bar element-component pairs are formed of bars that are uniform or non-uniform in cross-section over their length.

6. The electrode arrangement as defined in claim 1, wherein said three-dimensional grid structure of said electrodes is constructed by three-dimensionally interleaved sections.

7. The electrode arrangement as defined in claim 1, wherein said three-dimensional grid structure of said electrodes is formed in an unfinished body of mutually offset, throughgoing recesses in at least two mutually perpendicular planes and in at least two planes rotated 45° relative to said mutually perpendicular planes.

8. The electrode arrangement as defined in claim 7, wherein said recesses comprise drilled holes.

9. The electrode arrangement as defined in claim 7, wherein said recesses comprise: square recesses in section when viewing said unfinished body in two mutually perpendicular directions; and hexagonal recesses when viewing said unfinished body in two mutually perpendicular diagonal directions, and wherein said recesses are cut by a laser.

10. The electrode arrangement as defined in claim 7, further comprising:
    a wall plate defined on all sides of said unfinished body, wherein separation of said electrodes is formed by at least partial separation of said wall plate on all sides of said unfinished body.

11. The electrode arrangement as defined in claim 7, wherein said electrodes are separated by one of: drilling; laser cutting; and production of separating recesses between said two electrodes.

12. The electrode arrangement as defined in claim 1, wherein said grid structure is formed of plastic provided with a coating.

13. The electrode arrangement as defined in claim 1, wherein said grid structure is formed of a metal.

14. An electrochemical battery with two or more cells, each cell constructed of an electrode arrangement comprising: two electrodes each having a three-dimensional grid structure, which are held spaced apart from one another, said electrodes being arranged interleaved with one another in all directions in space, wherein at least one of said three-dimensional grid structure is separated in one plane.

15. The battery as defined in claim 14, further comprising:
    an electrolytically separating intermediate wall, wherein one of said three-dimensional grid structures defines a separating plane, and wherein the other of said three-dimensional grid structures is provided with said electrolytically separating intermediate wall in the separating plane of said one of said three-dimensional grid structure.

16. The battery as defined in claim 15, wherein said intermediate wall is formed by inserting or casting of a plate.

17. The battery as defined in claim 15, wherein said intermediate wall is formed by an unfinished body having a plane without drilled holes and without recesses.

18. The battery as defined in claim 15, wherein said intermediate wall is formed as part of one of said three-dimensional grid structures, and wherein the other of said three-dimensional grid structures is separated from said intermediate wall by separating recesses on both sides of said intermediate wall.

19. The battery is defined in claim 14, wherein each three-dimensional grid structure is separated in planes each arranged at a distance from one another.

20. A method for the manufacture of an electrochemical battery from an electrode arrangement comprising: two electrodes each having a three-dimensional grid structure, which are held spaced apart from one another, the electrodes being arranged interleaved with one another in all directions in space, the method comprising the steps of:

in an unfinished body, incorporating two mutually offset continuous recesses in at least two mutually perpendicular planes and in at least two planes offset therefrom by 45° in order to obtain a three-dimensional grid overall structure; and opening up of the overall structure into at least two individual structures representing the electrodes.

21. The method as defined in claim 20, further comprising the step of:

inserting one of: an end plate, an intermediate plate, and an end plate and an intermediate plate made of an electrically insulating material into the electrode arrangement before the opening up of the overall structure for the purpose of fixing the spacing of said two electrodes.

22. The method as defined in claim 21, further comprising the step of:

inserting an intermediate wall in an intermediate plane of at least one of the three-dimensional grid structures, the intermediate wall extending over the entire cross-sectional area of the electrode arrangement.

23. The method as defined in claim 20, further comprising the steps of:

forming an electrolytically separating intermediate wall by the absence of recesses in a plane of the unfinished body; and separating at least one of the three-dimensional grid structures into at least two electrode components by the removal of corresponding bar-element component parts.

24. The method as defined in claim 23, wherein the bar-element components are removed by incorporation of separating recesses.

25. The method as defined in claim 24, wherein the recesses are formed by one of: boring and laser.

* * * * *